Nov. 2, 1926.

W. WITTKOPF

OPTICAL DISK

Filed Dec. 10, 1924

1,605,418

Wm. Wittkopf
INVENTOR

BY Victor J. Evans
ATTORNEY

WITNESS:

Patented Nov. 2, 1926.

1,605,418

UNITED STATES PATENT OFFICE.

WILLIAM WITTKOPF, OF BALTIMORE, MARYLAND.

OPTICAL DISK.

Application filed December 10, 1924. Serial No. 755,053.

This invention contemplates the provision of an optical disk designed to protect the eyes from strain, and also help to make weak eyes stronger, the disk being adapted to be used with or without eye glasses.

In carrying out the invention, it is my purpose to provide an optical device having a plurality of spaced parallel slots to provide restricted sight spaces, the device protecting the eyes from the detrimental effect of light, and cause the image of the reading matter being viewed through the slots to stand out more prominently, with a consequent reduction of strain on the eyes.

The nature and advantages of the invention will be better understood when the following detailed description is read in connection with the accompanying drawing, the invention residing in the construction, combination and arrangement of parts as claimed.

In the drawing forming part of this application, like numerals of reference indicate similar parts in the several views, and wherein.

Figure 1:
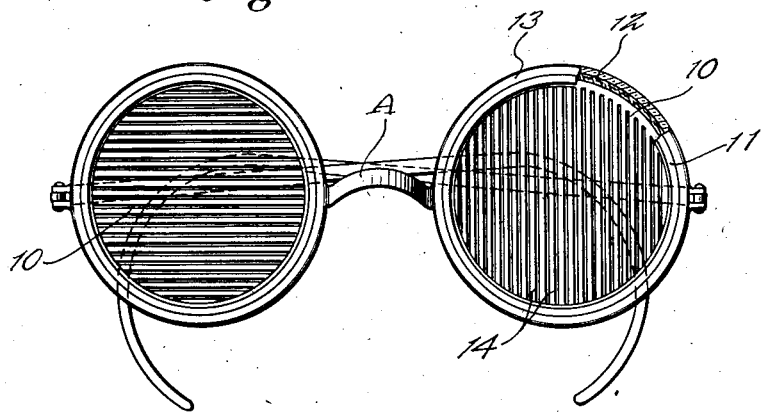
Figure 1 is a view of a pair of spectacle frames showing the optical disk associated therewith.

The device forming the subject matter of the present invention is primarily intended to preserve and restore the eye sight, with a view of eliminating the use of eye glasses which attract light to the eyes with harmful results. The invention is in the nature of a disk constructed from any suitable dark material, and which disk is indicated at 10. This disk is mounted in a ring or annulus 11 which is formed with an annular rib or tongue 12, the latter being adapted to snap into the groove formed in the rim 13 of the spectacle frames indicated generally at A. This disk 10 is provided with a plurality of spaced parallel slots 14, each slot providing a restricted sight space, inasmuch as the object or reading matter to be viewed is seen through these spaces. The size of the slots is with reference to their width of course varied to suit the condition of the eyes in each particular case, but by use of the invention, the latter protects the eyes from light, which is otherwise attracted by the use of eye glasses, both in advance of and from the rear of the glasses as will be readily understood. By cutting off the light or illumination from the eyes through the instrumentality of a disk in the manner just described, it has been found that the image or reading matter being viewed through the slots, stands out more prominently, than when viewed with the ordinary eye glasses with less strain on the eyes. In the case of very weak eyes, the disk 10 is adapted to be used in conjunction with the ordinary eye glass lens, and can be arranged either in advance of or at the rear of said lens indicated at 15. When used in this connection, the disk is arranged in the ordinary rim 16 of the eye glass frame. However, after the eyes become stronger, the disk 10 is adapted to be used without the lens 15, and it may also be stated that these slots may be arranged either in a horizontal or vertical position in front of the eyes if desired.

Figure 2:
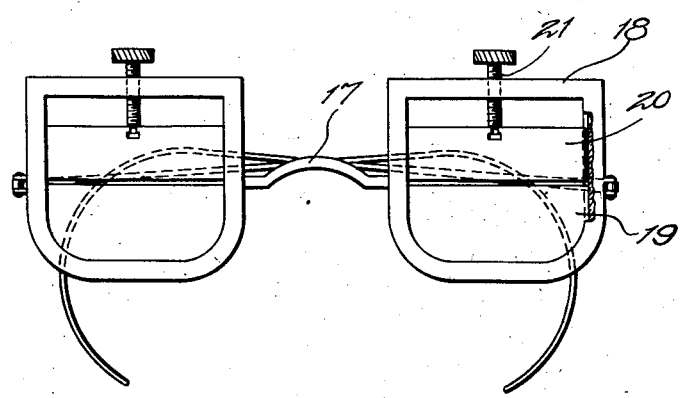
Figure 2 is a view of the device for testing the eyes to determine the desired size of the sight openings or slots in each particular case.
Figure 3:
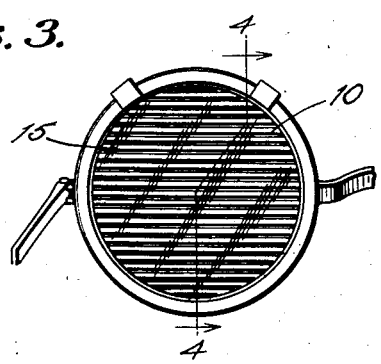
Figure 3 is a view showing the optical device associated with the lens.
Figure 4:
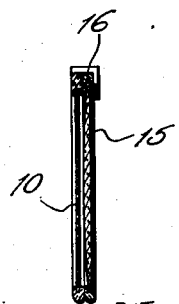
Figure 4 is a sectional view taken on line 4—4 of Figure 3.

In Figure 2, I have illustrated a device for testing the eyes for the purpose of determining the size of the sight slots or spaces, which device is constructed somewhat similar to an ordinary pair of eye glasses, the frame of which is indicated generally at 17. Each lens holder 18 has its opposite sides grooved to receive a lens of dark non-transparent material which is made up of two sections 19 and 20 respectively, the section 19 is stationary while the section 20 is susceptible of sliding adjustment toward and away from the section 19 being controlled by means of a threaded adjusting element 21 mounted on the frame and connected with the section 20 as shown in Figure 2. This frame is placed upon the head, the same as an ordinary pair of eye glasses, and by adjusting the sections 20 toward and away from the sections 19, the size of the sight openings or spaces most beneficial to the eyes can be readily determined. Then the disks 10 can be made with the slots 14 of that particular size.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

Having thus described the invention, I claim:

In combination, an eye-glass frame including rims of substantially rectangular outlines, each having opposed groove, a lens of dark, non-transparent material arranged in each rim, each lens including a fixed section and relatively slidably section, both of said sections being received by the groove of said rim, and a threaded adjusting element threaded thru an opening in said rim and swivelly connected with the sliding section of the lens, whereby the latter can be moved towards and away from the stationary part as and for the purpose specified.

In testimony whereof I affix my signature.

WILLIAM WITTKOPF.